April 27, 1948.  L. C. FRAZIER  2,440,662

APPARATUS FOR BUILDING TIRES

Filed Oct. 31, 1945  3 Sheets-Sheet 1

INVENTOR.
LARRY C. FRAZIER
BY
Oberlin & Limbach
ATTORNEYS

April 27, 1948.    L. C. FRAZIER    2,440,662
APPARATUS FOR BUILDING TIRES
Filed Oct. 31, 1945    3 Sheets-Sheet 2
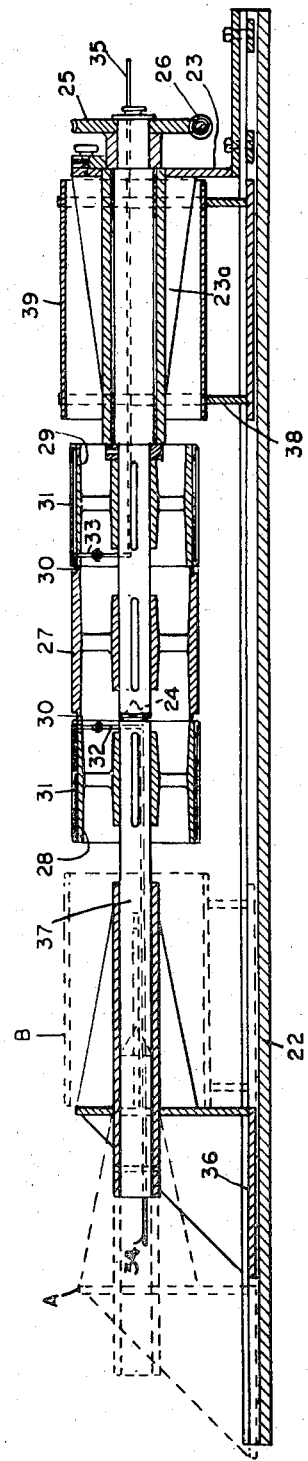
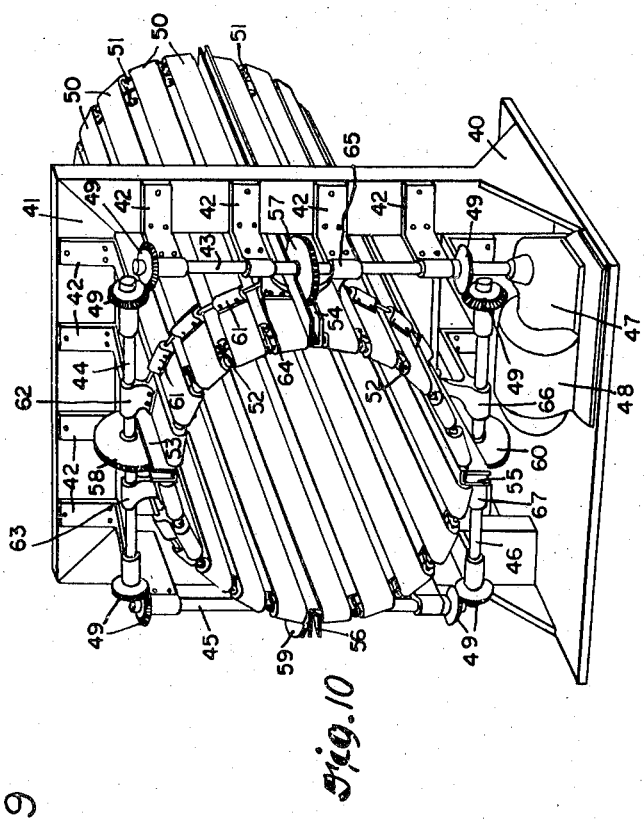
INVENTOR.
LARRY C. FRAZIER
BY
Oberlin & Limbach
ATTORNEYS INVENTOR.
LARRY C. FRAZIER
BY
Oberlin & Limbach
ATTORNEYS Patented Apr. 27, 1948

2,440,662

UNITED STATES PATENT OFFICE 2,440,662

APPARATUS FOR BUILDING TIRES

Larry C. Frazier, Lakewood, Ohio, assignor to National-Standard Company, Niles, Mich., a corporation of Michigan Application October 31, 1945, Serial No. 625,789

11 Claims. (Cl. 154—10)

This invention relates as indicated to tires and method and apparatus for building tires such as the pneumatic tires used on self-propelled vehicles such as automobiles, trucks, and the like.

The invention is concerned particularly with the fabric body of the tire. By the term "tire fabric" as used throughout the following description of my invention, it is intended to include the fibrous portion of the tire carcass structure whether the same be of cotton cord, steel, cable, or any of the various synthetic fibrous materials which are employed in tire construction. The term "fabric" is meant to include the body of fibers which are usually, in the first instance, provided in sheet form, and held in assembled relation as by weaving or, more commonly, by being caused to adhere by means of a layer of rubber or rubber substitute material.

In its broadest aspects, my invention is concerned with the provision of a novel tire carcass structure characterized in that the tire fabric is arranged differently from the structures of the prior art.

A further and more particular object of my invention is concerned with the provision of an improved method for the manipulation of the tire fabric during the course of the tire building operation.

Still a further and more particular object of the invention is to provide an improved mechanism for thus manipulating the tire fabric and by which mechanism the manipulation process is not only facilitated from the standpoint of time consumed but also results in a finished product in which the tire fabric is arranged much more accurately and precisely than could be expected to be the product of even the most skilled workmen.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation partially in section of one form of apparatus of my invention and by which certain aspects of the improved process may be performed;

Figs. 2 to 8 inclusive are diagrammatic representations of certain portions of the apparatus illustrated in Fig. 1 showing a certain series of successive steps which comprise one embodiment of the process of my invention;

Fig. 9 is a side elevational view partially in section of another form of apparatus constructed in accordance with the principles of my invention;

Fig. 10 is a perspective view drawn to an enlarged scale of one element of the apparatus illustrated in Fig. 9;

Figure 17:

Figs. 11 to 16 inclusive show one series of sequential steps utilizing the apparatus illustrated in Fig. 9 in carrying out yet another embodiment of the process of my invention; and Fig. 17 is a cross-section of a tire carcass band constructed in accordance with my invention.

Figure 1:
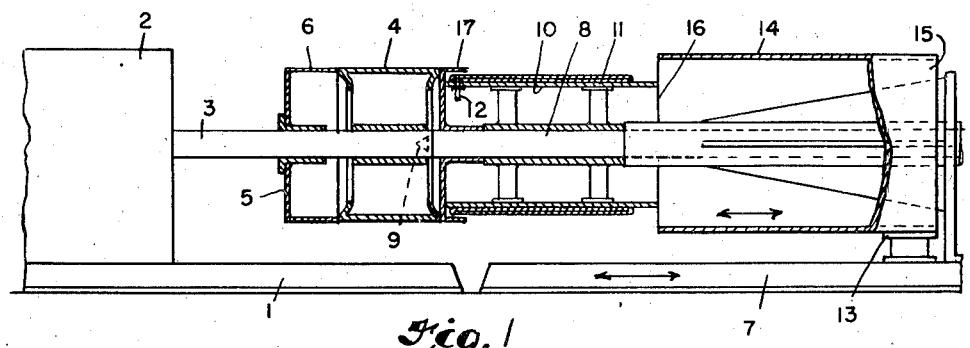

Referring now more specifically to the drawings and more especially to Fig. 1, the apparatus here illustrated comprises a machine bed generally indicated at 1, on one end of which is a prime mover housing generally indicated at 2 and from which projects a driven shaft 3 on which is secured a tire building drum 4. Slidably mounted on the shaft 3 is an auxiliary drum 5 provided with a peripheral work surface 6 which is in substantial alignment with the periphery of the main drum 4.

Alongside of the base 1 is a movable base 7 which movably supports a shaft 8 in axial alignment with the shaft 3. The end of the shaft 8 is provided with a conical projection 9 fitting into a corresponding recess in the end of the shaft 3 whereby the two shafts are maintained in axial alignment when in substantial abutting relation as illustrated in Fig. 1.

Mounted on the shaft 8 is a drum 10, the normal diameter of which is slightly less than the diameter of the building drum 4. Mounted on the drum 10 is an inflatable bag 11 extending entirely around the drum 10 and forming the work supporting surface thereon. A suitable conduit 12 is provided by which the bag 11 may be inflated so as to increase the effective diameter of the drum 10.

Mounted on a standard 13 which is movable with respect to the base 7 is a cylindrical member 14 supported at only its right-hand end 15 as illustrated in Fig. 1, so as to provide an unobstructed open end 16 for telescopic engagement with the drums 10 and 4.

Mounted on the forward end of the shaft 8 is an auxiliary drum 17, the diameter of which is substantially equal to the diameter of the drum 4.

The apparatus illustrated in Fig. 1 may be utilized for a number of different purposes. One of the principal uses for such apparatus is in the tire building process now in common use when a band or pocket of tire fabric is constructed on a separate drum and then transferred over onto the main building drum on which the tire carcass in its entirety is finally assembled. Figs. 2 to 8 illustrate the manner in which the apparatus of Fig. 1 may be employed in carrying out such process.

Figure 2:
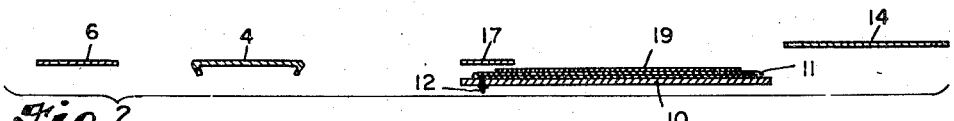

The first step is to have the parts arranged so that the drum 10 is moved to the right away from the building drum 4 and the drum 17 to the left of the auxiliary drum 10, and with the bag 11 substantially deflated. The drum 10 is then rotated by rotating the shaft 8 and there is built up on the outside of the bag 11 a suitable number of plies of tire fabric which, as built up, are indicated in Fig. 2 by the reference character 19 and will be referred to hereafter as the band. After the band 19 is thus formed, the auxiliary drum 17 is moved into the position on the shaft 8 as illustrated by Fig. 1, i. e. the parts now occupy the position illustrated in Fig. 2.

Figure 3:
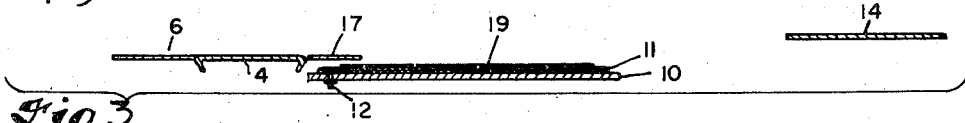

The next step in the process is to move the shaft 8 into abutting engagement with the shaft 3, thus bringing the several drums into the relative positions illustrated in Fig. 3, it being noted that the band 19 now slightly overlaps with the inner face of the auxiliary drum 17.

Figure 4:
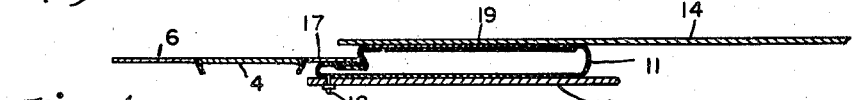

The next step in the process is to move the cylindrical member 14 into telescopic engagement with the drum 10, after which the bag 11 is inflated, forcing the band 9 into frictional engagement with the inner periphery of the cylinder 14. This latter condition is illustrated in Fig. 4.

Figure 5:
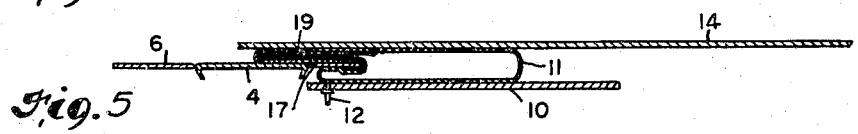
Figure 6:
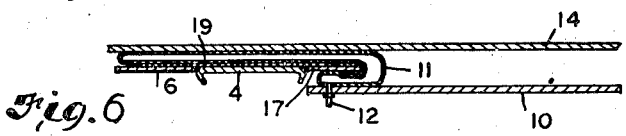
Figure 7:
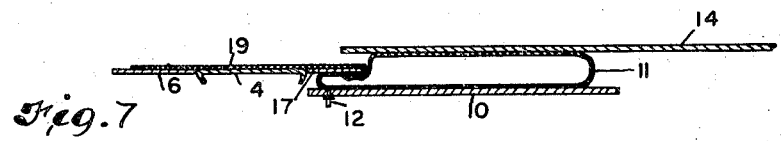
Figure 8:
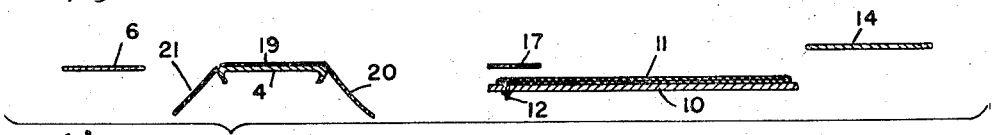

After the bag has been inflated and the band forced into engagement with the inner periphery of the cylinder 14, the latter is then moved axially to the left, which results in a folding over of the band 9 onto the drums 17, 4, and 6 progressively, as illustrated by Figs. 5 and 6. After the cylinder 14 has progressed to the left for a distance sufficient to completely turn over the band 9, the cylinder 14 is then moved to the right again, and during such movement the bag 11 is now in frictional engagement with the inner periphery of the cylinder 14 so that such bag is carried back into the position illustrated in Fig. 7.

The bag 11 is then deflated, after which the drum 10, cylinder 14, and auxiliary drum 17 are moved to the right, away from the building drum 4, and the auxiliary drum 6 is moved to the left, away from the building drum 4, leaving the band 9 positioned centrally on the building drum 4 with the opposite edges 20 and 21 thereof depending from the opposite edges of the building drum 4. The band 9 is now in condition to receive the annular built-up metallic bead assemblies which are placed against the opposite edges of drum 4, and then the edges 20 and 21 of the band 9 turned up around the bead assemblies to anchor the same in the tire carcass in accordance with conventional practice.

The apparatus illustrated in Fig. 9 is generally similar to that illustrated in Fig. 1 in that it employs the similar expedient of an inflatable bag for a like purpose, but in other respects the apparatus and the results accomplished thereby are quite different.

The apparatus illustrated in Fig. 9 comprises the base 22 on which is fixedly mounted a standard diagrammatically illustrated at 23 carrying a fixed bearing bracket 23a and by which a shaft 24 is rotatably supported. The shaft 24 is driven by means of a gear 25 through a pinion 26.

Keyed to the shaft 24 is a center building drum 27 with auxiliary drums 28 and 29 on opposite sides thereof. Drum 29 is keyed to the shaft 24 and drum 28 is keyed to a tail stock 37. While for most purposes there need be no relative axial movement between the center drum 27 and the auxiliary drums 28 and 29, provision for such relative movement may be provided if desired.

The drum 27 is a solid drum provided at opposite ends with relieved portions 30 for the purposes hereinafter more fully explained.

The drums 28 and 29 are generally similar in their construction to the drum 10 of Fig. 1 in that they too are provided on their outer surface with an inflatable bag 31, the normal outside diameter of which is equal to the outside diameter of the center drum 27. Conduits for the inflation of the bags 31 are illustrated at 32 and 33 and by extending axially out of the shaft 24, as at 34 and 35 respectively, make possible the employment of a suitable gland connection by which pressure may be maintained from an outside line to the bags 31, even though the drums 28 and 29 may be rotated.

Slidably mounted on the base 2 is a head 36 which carries a tail stock 37 adapted to engage and support the end of the shaft 24. Suitable means may be provided for moving the head 36 from the full line position illustrated in Fig. 9 to the dotted line position generally indicated at A in said figure. Since such means are well-known, they have been omitted from the illustration for purposes of clarity.

Likewise movably supported on the base 22 is a slide head 38 which carries a cylinder 39 coaxially with the shaft 24. The inside diameter of the cylinder 39 is slightly greater than the outside diameter of the bags 31 in order to make possible the carrying out of processes such as those represented by the steps diagrammatically illustrated in Figs. 11 to 16.

The apparatus will also be provided with suitable means for moving the slide head 38 and its cylinder 39 along the base 22 from the full line position at the right-hand end of Fig. 9 to the dotted line position illustrated at B at the left-hand end of such figure. The precise means for so moving the slide head 38 may be any of the many means available in the art for this purpose and since the same forms no part of the present invention a more detailed illustrated and description of the same has been omitted.

Instead of employing a plain cylindrical member such as the cylinder 39, there may be employed in place thereof an apparatus such as that illustrated in Fig. 10. The apparatus illustrated in Fig. 10 is especially useful for machines where the distance between the right-hand end of the auxiliary drum 29 and the fixed bracket 23 is limited. The apparatus consists of a base generally indicated at 40 which is adapted to be moved along the fixed base 22. Supported by the base 40 is rectangular frame-work generally indicated at 41 from which project a number of brackets 42 supporting shafts 43, 44, 45, and 46. The shaft 43 extends from a speed reducer unit 47 driven by a motor 48. Bevel pinions 49 interconnect the several shafts so that they are all driven in unison and in the same direction by the motor 48.

Supported within the rectangular frame 41 in a manner hereinafter more fully explained are a series of laterally contiguous endless webs 50 trained about rollers such as 51 at one end of the machine, and rollers 52 at the other end of the machine. The rollers 51 are all mounted on a common ring and the rollers 52 are all mounted on a common ring. These rings are maintained in axially spaced relation by channel shaped members 53, 54, 55, and 56. On the outer face of the webs of each of these channel shaped members there is formed a rack. The rack thus carried by the channel 54 is in mesh with a pinion 57 on the shaft 43. The rack in the channel 53 is in mesh with a pinion 58 on the shaft 44. The rack in the channel 56 is in mesh with a pinion 59 on the shaft 45 and the rack in the channel 55 is in mesh with a pinion 60 on the shaft 46.

Each of the endless webs 50 has riveted or otherwise secured thereto lugs 61, excepting those webs which lie on opposite sides of the channel members and these carry bearing brackets such as 62, 63, 64, 65, 66, 67, and two similar brackets on opposite sides of the channel 56 which are not shown.

It will be observed that when the motor 48 is energized so as to drive the shaft 46 in a counter-clockwise direction, when viewed from the right-hand side of the apparatus as illustrated in Fig. 10, the four channels and the rings on opposite ends thereof which carry the rollers 51 and 52 will be advanced to the left. The lugs 61 and the brackets 62 to 67 will be held stationary, however, so that the webs 50 will be forced to travel around the rollers about which they are trained. Thus for each movement of one inch to the left of the channel members such as 53, a point on the inner face of any web will move to the left a distance of about two inches.

In Figs. 11 to 16 are shown diagrammatically the center building drum 27 and the auxiliary drums 28 and 29 on opposite sides thereof, and these figures show diagrammatically the manner in which the apparatus of Fig. 9 may be employed in carrying out the principles of my invention.

Figure 12:
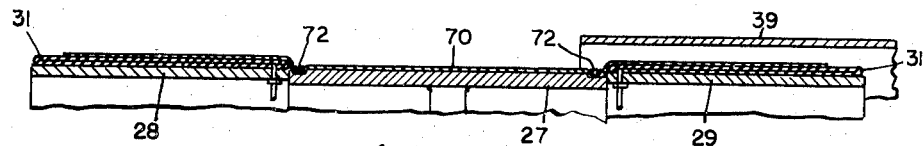
Figure 13:
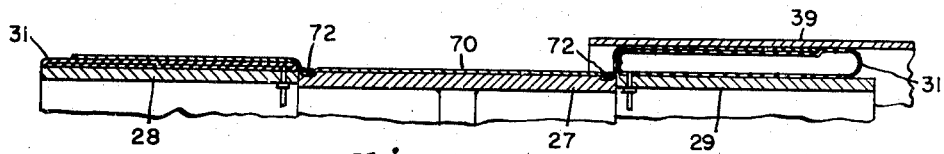
Figure 14:
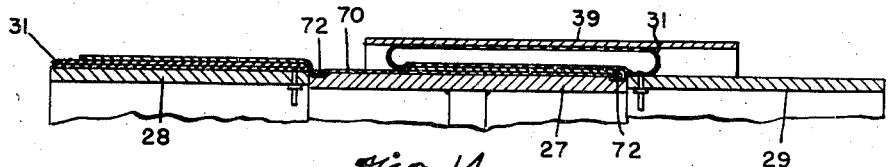

With the cylindrical member 39, or the device of Fig. 10, whichever is employed, off to one side of the drum assembly, there is first wound onto the drum assembly a suitable layer of tire fabric generally indicated at 70. For the construction of pneumatic tires for use on light passenger cars, only a single ply of tire fabric need be thus wound on the drum assembly in the manner illustrated in Fig. 11. After the tire fabric has been thus placed on the drum assembly, there is next placed in the depressions provided by the relieved areas 30 on the center drum 27, but on top of the tire fabric, a built-up metallic bead assembly generally indicated at 72. With the parts thus preliminarily prepared, the cylinder 39 is then moved to the left until it overlaps the auxiliary drum 29 as illustrated in Fig. 12, whereupon the bag 31 on the drum 29 is inflated as illustrated in Fig. 13, forcing that portion of the tire fabric band overlying the drum 29 into frictional engagement with the inner periphery of the cylinder 39.

The next step is to move the cylinder 39 to the left to cause the edge portion of the tire fabric band to be folded over similarly to the manner described in connection with Figs. 2 to 7.

Figure 15:
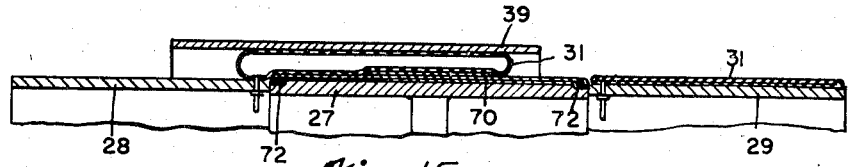
Figure 16:
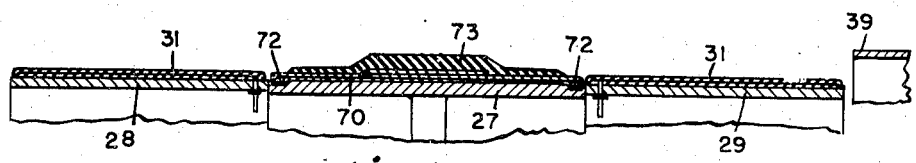

The next step in the process is to return the cylinder 39 to the right until the bag 31 is again in its proper position over the auxiliary drum 29, whereupon the bag 31 is deflated, freeing the cylinder 39 which is then moved over to the left over the auxiliary drum 28, whereupon the procedure just described in connection with the auxiliary drum 29 is repeated to fold over onto the center drum 27 that portion of the tire fabric web which overlies the auxiliary drum 28. When this has been accomplished as illustrated in Fig. 15, the cylinder is then moved to the left carrying the bag 31 back on to its normal position on the auxiliary drum 28, whereupon the bag 31 is deflated and the cylinder 39 then moved to the right, i. e. the position illustrated in Figs. 9 and 16.

After the fabric portion of the tire has thus been assembled, there is then wound onto the drum 27 a tread and side wall section 73 to finally produce the composite carcass structure, the cross-section of which is illustrated in Fig. 17.

Figure 11:
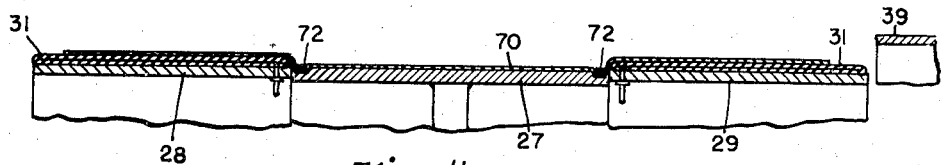

It should be noted that in the preferred embodiment of my invention, the axial length of the tire fabric band wound on the drum assembly, as illustrated in Fig. 11, is such that a sufficient amount of the same will overlie each of the auxiliary drums 28 and 29 so that when such portions are doubled back, the edges thereof will lie along the opposite sides of the tread portion of the tire. This then produces a tire carcass structure in which the bead assembly is anchored in a continuous fold of the tire fabric. There are no discontinuous plies in the bead area and underneath the tread portion of the tire there are 50% more plies than there are in the side wall portions which are required to be of greater flexibility.

In the description of the operation of the apparatus illustrated in Figs. 1 and 9, reference has been made to the use of the cylinders 14 and 39. It is within the contemplation of my invention as previously indicated to employ in place of such cylinders the apparatus illustrated in Fig. 10 which makes possible a greater axial throw of the inflated bags and the tire fabric portions folded over thereby. This is an important feature when the apparatus is employed with certain types of tire building machines where space is at a premium.

Other modes of applying the principle of the invention may be employed, change being made as regards the details described, provided the features stated in any of the following claims or the equivalent of such be employed.

I therefore particularly point out and distinctly claim as my invention:

1. In apparatus of the character described, the combination of a drum assembly, means for changing the effective relative diameters of different axially extending sections of said drum, and means adapted to closely surround said drum and move axially relative thereto.

2. In apparatus of the character described, the combination of a drum assembly, means for increasing the effective diameter of an axially extending section of said drum, and means adapted to closely surround said drum and move axially relative thereto.

3. In apparatus of the character described, the combination of a drum adapted to support an endless band thereon, means for changing the effective relative diameters of different axially extending sections of said drum, and means surrounding said drum, movable axially relative thereto and adapted to engage such band in the area of said changed effective diameter of the drum.

4. In apparatus of the character described, the combination of a drum adapted to support thereon, in closely embracing relation, an endless band, means for changing the effective relative diameters of different axially extending sections of said drum, and means surrounding said drum, movable axially relative thereto and adapted to engage such band in the area of said changed effective diameter of the drum, and by said relative axial movement fold at least a portion of said band over onto itself.

5. In apparatus of the character described, the combination of a drum adapted to support thereon, in closely embracing relation, an endless band, means for increasing the effective relative diameter of an axially extending section of said drum, and means surrounding said drum, movable axially relative thereto and adapted to engage such band in the area of said increased effective diameter and by said relative axial movement shift the axial position of at least a portion of said band by a movement which includes folding the same over onto itself.

6. In apparatus of the character described, the combination of axially aligned first and second drums, means for varying the relative effective diameters of said drums, and means movable telescopically of said drums and adapted on its inner periphery to engage a band on one of said drums, and by folding the same over onto itself transfer such band from one drum to the other.

7. In apparatus of the character described, the combination of axially aligned first and second drums, an inflatable bag carried by and comprising the peripheral surface of said second drum, and substantially cylindrical means arranged to move axially relatively to said drums and having an inside diameter slightly greater than said drums.

8. In apparatus of the character described, the combination of axially aligned first and second drums, an inflatable bag carried by and comprising the peripheral surface of said second drum, and substantially cylindrical means arranged to move axially relatively to said drums and of such inside diameter that a web of work material mounted on said bag may be forced into frictional engagement with the inner periphery of said substantially cylindrical member upon inflation of said bag.

9. In apparatus of the character described, the combination of a central drum, an auxiliary drum on each side of said central drum and coaxial therewith, an inflatable bag on each of said auxiliary drums and comprising the periphery thereof, and a substantially cylindrical member arranged to move axially over said several drums in closely spaced relation to the periphery thereof.

10. In apparatus of the character described, the combination of a central drum, an auxiliary drum on each side of said central drum and coaxial therewith an inflatable bag on each of said auxiliary drums and comprising the periphery thereof, and means arranged to move axially over said several drums in closely spaced relation to the periphery thereof, said last named means comprising an assembly of a plurality of laterally contiguous endless webs.

11. In apparatus of the character described, the combination of a central drum, an auxiliary drum on each side of said central drum and coaxial therewith an inflatable bag on each of said auxiliary drums and comprising the periphery thereof, and means arranged to move axially over said several drums in closely spaced relation to the periphery thereof, said last named means comprising an assembly of a plurality of laterally contiguous endless webs and means for bodily moving said assembly axially while simultaneously moving said webs so that a reference point on the inner rim of any web travels axially at a rate greater than the rate of travel of the assembly.

LARRY C. FRAZIER.

REFERENCES CITED

The following references are of record in the file of this patent:

UNITED STATES PATENTS

| Number | Name | Date |
|---|---|---|
| 1,235,052 | Price | July 31, 1917 |
| 1,297,295 | Ferris | Mar. 11, 1919 |
| 1,374,408 | Trogner | Apr. 12, 1921 |
| 1,400,301 | McClurg | Dec. 13, 1921 |
| 1,755,933 | Pfeiffer | Apr. 22, 1930 |
| 1,759,232 | Gammeter | May 20, 1930 |
| 2,251,904 | Breth et al. | Aug. 12, 1941 |